United States Patent
Li et al.

(10) Patent No.: US 12,110,962 B2
(45) Date of Patent: Oct. 8, 2024

(54) TRANSMISSION MECHANISM

(71) Applicant: NGC (HUAI'AN) HIGH SPEED GEAR MANUFACTURING CO., LTD., Jiangsu (CN)

(72) Inventors: Hongjian Li, Jiangsu (CN); Aimin He, Jiangsu (CN); Xiaofei Guo, Jiangsu (CN); Rongjun Chen, Jiangsu (CN)

(73) Assignee: NGC (HUAI'AN) HIGH SPEED GEAR MANUFACTURING CO., LTD., Jiangsu (CN)

( * ) Notice: Subject to any disclaimer, the term of this patent is extended or adjusted under 35 U.S.C. 154(b) by 0 days.

(21) Appl. No.: 18/013,920

(22) PCT Filed: Nov. 10, 2022

(86) PCT No.: PCT/CN2022/131037
§ 371 (c)(1),
(2) Date: Dec. 30, 2022

(87) PCT Pub. No.: WO2023/236446
PCT Pub. Date: Dec. 14, 2023

(65) Prior Publication Data
US 2024/0255051 A1    Aug. 1, 2024

(30) Foreign Application Priority Data
Jun. 7, 2022   (CN) .......................... 202210639501.9

(51) Int. Cl.
*F16H 57/04*    (2010.01)
*F16H 57/08*    (2006.01)

(52) U.S. Cl.
CPC ..... *F16H 57/0486* (2013.01); *F16H 57/0427* (2013.01); *F16H 57/043* (2013.01);
(Continued)

(58) Field of Classification Search
CPC ............. F16H 57/0486; F16H 57/0427; F16H 57/043; F16H 57/045; F16H 57/0471; F16H 57/082; F16H 2057/085
See application file for complete search history.

(56) References Cited

U.S. PATENT DOCUMENTS

2011/0172048 A1    7/2011   Nishida et al.
2015/0361962 A1*  12/2015   Hager ..................... F03D 80/70
                                                              475/159
(Continued)

FOREIGN PATENT DOCUMENTS

CN      105840788 A     8/2016
CN      205715576 U    11/2016
(Continued)

OTHER PUBLICATIONS

Machine translation of CN 110081150 A . (Year: 2019).*
(Continued)

*Primary Examiner* — Jacob S. Scott
*Assistant Examiner* — Farhana Pervin
(74) *Attorney, Agent, or Firm* — Carter, DeLuca & Farrell LLP; George Likourezos

(57) ABSTRACT

A transmission mechanism includes a planet carrier, a planet gear, a pin, a sliding bearing, and thrust bearings. The planet gear is rotatably disposed on the planet carrier through the pin. The thrust bearings are disposed between one end of the planet gear and the planet carrier, and between another end of the planet gear and the planet carrier, respectively. A first lubrication gap is formed between each thrust bearing and an end surface the planet gear. The sliding bearing is sleeved on the pin and is disposed between the planet gear and the pin. A second lubrication gap is formed between an inner circumference of the sliding bearing and the pin or between an outer circumference of the sliding bearing and the planet gear. Oil channels are disposed on the pin. Lubricating oil
(Continued)

enters the first lubrication gap and the second lubrication gap through the oil channels respectively.

10 Claims, 6 Drawing Sheets

(52) U.S. Cl.
CPC ....... *F16H 57/045* (2013.01); *F16H 57/0471* (2013.01); *F16H 57/082* (2013.01); *F16H 2057/085* (2013.01)

(56) References Cited

U.S. PATENT DOCUMENTS

| | | | | |
|---|---|---|---|---|
| 2018/0340606 | A1* | 11/2018 | Deitmers | F16C 25/02 |
| 2019/0203768 | A1* | 7/2019 | Meyer | F16C 33/1055 |
| 2019/0249766 | A1 | 8/2019 | Meyer | |
| 2020/0018352 | A1* | 1/2020 | Tsurumi | F16C 33/76 |
| 2020/0166117 | A1* | 5/2020 | Simon | F16H 57/0482 |
| 2020/0300355 | A1* | 9/2020 | Forsberg | F16H 57/0431 |
| 2022/0010782 | A1* | 1/2022 | Hoelzl | F03D 9/25 |
| 2022/0372955 | A1* | 11/2022 | Dietz | F03D 80/70 |

FOREIGN PATENT DOCUMENTS

| | | |
|---|---|---|
| CN | 205715582 U | 11/2016 |
| CN | 205937774 U | 2/2017 |
| CN | 107299966 A | 10/2017 |
| CN | 208057907 U | 11/2018 |
| CN | 110081150 A | 8/2019 |
| CN | 211059342 U | 7/2020 |
| CN | 114877033 A | 8/2022 |
| JP | 2008089078 A | 4/2008 |
| JP | 2019019916 A | 2/2019 |

OTHER PUBLICATIONS

Machine translation of JP 2008089078 A (Year: 2008).*
Thrust Washer bearing (Year: 2020).*
Chinese Office Action issued by the Chinese Patent Office in connection with International Application No. 202210639501.9, dated Jun. 29, 2023. (Translation Attached).
International Search Report issued by the China National Intellectual Property Administration in connection with International Application No. PCT/CN2022/131037, dated Mar. 4, 2023.

* cited by examiner

TRANSMISSION MECHANISM

CROSS-REFERENCE TO RELATED APPLICATIONS

The present application is a national stage application filed under 37 U.S.C. 371 based on International Patent Application No. PCT/CN2022/131037, filed Nov. 10, 2022, which claims priority to Chinese Patent Application No. 202210639501.9 filed Jun. 7, 2022, the disclosures of which are incorporated herein by reference in their entirety.

TECHNICAL FIELD

The present application relates to the field of gearbox technology, for example, a transmission mechanism.

BACKGROUND

A gearbox is a key component of a wind turbine. The gearbox is a device that implements a power transmission and output through a fit of transmission mechanisms including gears in various specifications and a shaft system. In the related art, a gearbox of a wind turbine generally contains transmission mechanisms including a planet gear. A rolling bearing is mostly used for supporting the planet gear. Some wind-power gearboxes also use sliding bearings. Due to the special application of the wind-power gearbox, once the sliding bearing of the planet gear fails, it may lead to failure soon and may also cause the damage and failure of an entire transmission mechanism inside the gearbox, which finally causes the gearbox to be taken down for maintenance and makes the cost much expensive.

SUMMARY

The present application provides a transmission mechanism with a relatively sound lubrication effect, making the service life of a thrust bearing and the service life of a sliding bearing relatively long.

An embodiment of the present application provides a transmission mechanism. The transmission mechanism includes a planet carrier, a planet gear, a pin, a sliding bearing, and thrust bearings. The planet gear is rotatably disposed on the planet carrier through the pin. The thrust bearings are disposed between one end of the planet gear and the planet carrier, and between another end of the planet gear and the planet carrier respectively. A first lubrication gap is formed between each thrust bearing and an end surface of the planet gear. The sliding bearing is sleeved on the pin and is disposed between the planet gear and the pin. A second lubrication gap is formed between an inner circumference of the sliding bearing and the pin or between an outer circumference of the sliding bearing and the planet gear. Oil channels are disposed on the pin. Lubricating oil enters the first lubrication gap and the second lubrication gap through the oil channels respectively. The oil discharge of the first lubrication gap and the oil discharge of the second lubrication gap do not interfere with each other.

Figure 1:
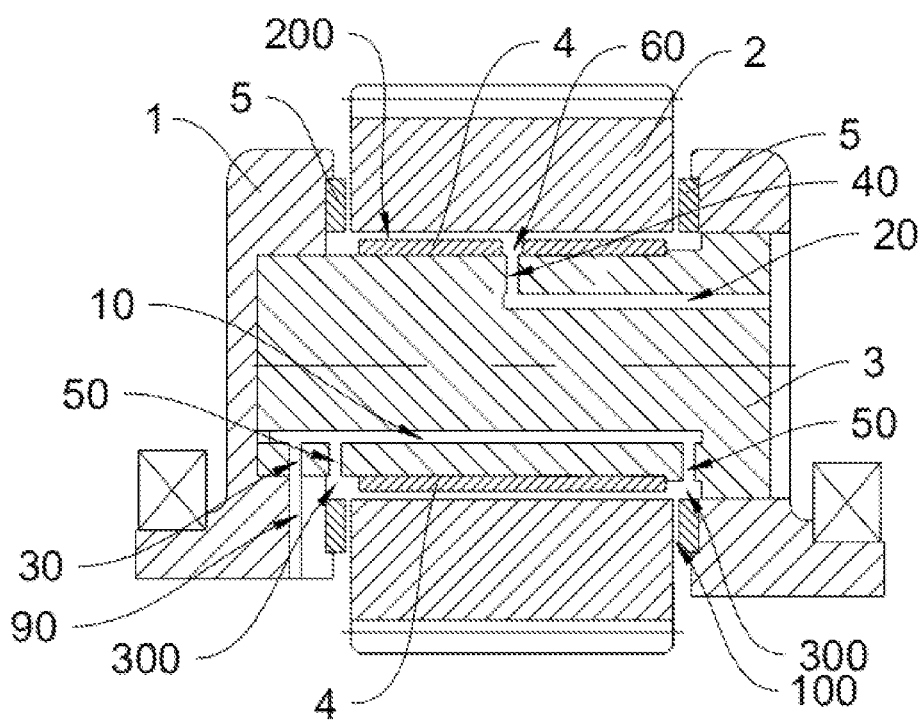
FIG. 1 is diagram one illustrating the structure of a transmission mechanism provided with a sliding bearing according to an embodiment of the present application (with no rotational fit between the sliding bearing and a pin).

REFERENCE LIST 1 planet carrier
2 planet gear
3 pin
4 sliding bearing
5 thrust bearing
6 distance ring
100 first lubrication gap
200 second lubrication gap
300 oil distribution cavity
400 oil passing cavity
10 oil inlet channel
20 axial oil discharge channel
30 oil receiving channel
40 radial oil discharge channel
50 first oil distribution channel
60 radial oil discharge hole
70 second oil distribution channel
80 oil passing hole
90 oil supply channel

DETAILED DESCRIPTION

In the description of the present application, terms "joined", "connected" and "secured" are to be understood in a broad sense unless otherwise expressly specified and limited. For example, the term "connected" may refer to "securely connected", "detachably connected" or "integrated", may refer to "mechanically connected" or "electrically connected" or may refer to "connected directly", "connected indirectly through an intermediary" or "connected inside two components" or "interaction relations between two components". For those of ordinary skill in the art, specific meanings of the preceding terms in the present application may be construed according to specific circumstances.

In the present application, unless otherwise expressly specified and limited, when a first feature is described as "on" or "below" a second feature, the first feature and the second feature may be in direct contact or be in contact via another feature between the two features instead of being in direct contact. Unless otherwise expressly specified and limited, when a first feature is described as "above" or "below" a second feature, the first feature and the second feature may be in direct contact or be in contact via another feature between the two features. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of this embodiment, it is to be noted that orientations or position relations indicated by terms such as "above", "below", "left" and "right" are based on the drawings. These orientations or position relations are intended only to facilitate the description and simplify an operation and not to indicate or imply that a device or element referred to must have such particular orientations or must be configured or operated in such particular orientations. Thus, these orientations or position relations are not to be construed as limiting the present application. In the description of the present application, unless otherwise noted, the term "a plurality of" or "multiple" means two or more. In addition, the terms "first" and "second" are used only to distinguish between descriptions and have no special meaning.

In the related art, a sliding bearing is installed on a planet gear. Lubricating oil is supplied to the sliding bearing through an oil channel on a pin. An oil channel communicating with the oil channel on the pin is disposed in the middle of the sliding bearing. In an actual gearbox operation, part of the lubricating oil flowing through the sliding bearing may pass through two end surfaces of the planet gear. Once the sliding bearing is worn, wear particles taken away by the lubricating oil pass through the thrust sliding bearing again, thereby causing damage to the thrust sliding bearing and even leading to the failure of the thrust sliding bearing of the planet gear. Based on the technical problem in the related art, this embodiment provides a transmission mechanism. The specific structure is as below.

As shown in FIGS. 1 to 4, the transmission mechanism includes a planet carrier 1, a planet gear 2, a pin 3, a sliding bearing 4, and thrust bearings 5. In an embodiment, the pin is installed on the planet carrier 1. The planet gear 2 is installed on the planet carrier 1 through the pin 3 and is sleeved out of the pin 3. Each thrust bearing 5 is installed between an end of the planet gear 2 and a web on a side of the planet carrier 1. Moreover, a first lubrication gap 100 is formed between each thrust bearing 5 and an end surface of the planet gear 2. The sliding bearing 4 is sleeved on the pin 3 and is disposed between the planet gear 2 and the pin 3. A second lubrication gap 200 is formed between an inner circumference of the sliding bearing 4 and the pin 3 or between an outer circumference of the sliding bearing 4 and the planet gear 2. Oil channels are disposed on the pin 3. Lubricating oil enters the first lubrication gap 100 and the second lubrication gap 200 through the oil channels respectively. The oil discharge of the first lubrication gap 100 and the oil discharge of the second lubrication gap 200 do not interfere with each other.

The lubricating oil enters the first lubrication gap 100 and the second lubrication gap 200 through the oil channels on the pin 3 respectively so that the lubricating oil entering the first lubrication gap 100 and the lubricating oil entering the second lubrication gap 200 do not interfere with each other. A part of the lubricating oil is discharged after lubricating the thrust bearings 5. The other part of the lubricating oil is discharged after lubricating the sliding bearing 4. In this case, the lubricating oil carrying wear particles after lubricating the sliding bearing 4 is prevented from entering the first lubrication gap 100, or the lubricating oil carrying wear particles after lubricating the thrust bearings 5 is prevented from entering the second lubrication gap 200. Accordingly, particles are prevented from wearing the thrust bearings 5 and the sliding bearing 4, effectively prolonging the service life of the thrust bearings 5 and the service life of the sliding bearing 4.

In an embodiment, two ends of the sliding bearing 4, the planet carrier 1, the planet gear 2, the pin 3, and the thrust bearings 5 form a plurality of oil distribution cavities 300. Each oil distribution cavity 300 communicates with two first lubrication gaps 100 and the second lubrication gap 200. An oil discharge channel and an oil inlet channel 10 are disposed on the pin 3. The oil channels include at least two first oil distribution channels 50. In the present application, two first oil distribution channels 50 are arranged. In other embodiments, the number of first oil distribution channels 50 may be added according to specific needs. A first end of the oil discharge channel communicates with the second lubrication gap 200. A second end of the oil discharge channel is configured to communicate with a gearbox oil pool. The oil inlet channel 10 is configured to feed the lubricating oil. A first end of each first oil distribution channel 50 communicates with the oil inlet channel 10 and an oil distribution cavity 300.

The lubricating oil enters the oil inlet channel 10 and then flows into the oil distribution cavities 300 through the two first oil distribution channels 50. A part of the lubricating oil in each oil distribution cavity 300 enters the first lubrication gap 100 to lubricate the thrust bearings 5. The other part of the lubricating oil in each oil distribution cavity 300 enters the second lubrication gap 200 to lubricate the sliding bearing 4. When the lubricating oil is supplied, the lubricating oil has a preset thrust. A part of the lubricating oil flows along the first lubrication gap 100 and then is discharged directly. The other part of the lubricating oil flows along the second lubrication gap 200, and then the lubricating oil flowing out of the oil distribution cavities 300 on two ends flows to each other and finally flows to the oil discharge channel to be discharged. In the preceding structure, the lubricating oil can lubricate the sliding bearing 4 and the thrust bearings 5 simultaneously through the oil inlet channel 10 on the pin 3, resulting in a compact structure and convenient processing. Moreover, the lubricating oil entering the first lubrication gap 100 is relatively clean and does not contain wear particles, avoiding damage to the thrust bearings 5 and effectively prolonging the service life of the thrust bearings 5. Additionally, the lubricating oil lubricates the sliding bearing 4 and then is discharged into the gearbox oil pool through the oil discharge channel so that the lubricating oil after flowing through the second lubrication gap 200 is directly discharged from the inside of the pin 3. This arrangement helps take away heat and wear particles of the sliding bearing 4 can be taken away quickly and prevents the lubricating oil flowing through the second lubrication gap 200 from flowing into the thrust bearings 5 and wearing the thrust bearings 5, thereby effectively improving the lubrication effect of the lubricating oil on the sliding bearing 4 and the thrust bearings 5 and prolonging the service life of the sliding bearing 4 and the service life of the thrust bearings 5.

In an embodiment, the oil discharge channel includes a radial oil discharge channel 40 and an axial oil discharge channel 20. The axial oil discharge channel 20 extends in an axial direction of the pin 3 and communicates with the gearbox oil pool. The radial oil discharge channel 40 extends in a radial direction of the pin 3. Two ends of the radial oil discharge channel 40 communicate with the second lubrication gap 200 and the axial oil discharge channel 20 respectively. This arrangement facilitates processing and improves the smoothness and uniformity of the lubricating oil flowing in the oil discharge channel, thereby enabling the lubricating oil entering the second lubrication gap 200 to be distributed evenly and improving the lubrication effect.

In an embodiment, the oil inlet channel 10 extends in the axial direction of the pin 3. The two first oil distribution channels 50 each extend in the radial direction of the pin 3. This arrangement facilitates processing and enables the lubricating oil to flow smoothly and be distributed evenly, thereby improving the lubrication effect.

In an embodiment, the distance between the oil inlet channel 10 and an axis of the pin 3 is equal to the distance between the axial oil discharge channel 20 and the axis of the pin 3, preventing the center of gravity of the pin 3 from deviating excessively and improving the structural stability of the pin 3.

In this embodiment, the pin 3 engages with webs on two sides of the planet carrier 1 and has an interference fit with the webs, improving the structural stability. In an embodiment, an oil receiving channel 30 is disposed on the pin 3 in the radial direction. An oil supply channel 90 is disposed on a web on a side of the planet carrier 1. A first end of the oil supply channel 90 is configured to communicate with an oil supply system. A second end of the oil supply channel 90 communicates with a first end of the oil receiving channel 30. A second end of the oil receiving channel 30 communicates with the oil inlet channel 10. The arrangement in which the oil supply channel 90 is disposed on the web on a side of the planet carrier 1 helps the oil receiving channel 30 to communicate with the oil supply system, thereby supplying the lubricating oil to the oil inlet channel 10, preventing a pipeline of the oil supply system from interfering with the transmission mechanism, and improving structural compactness.

Figure 2:
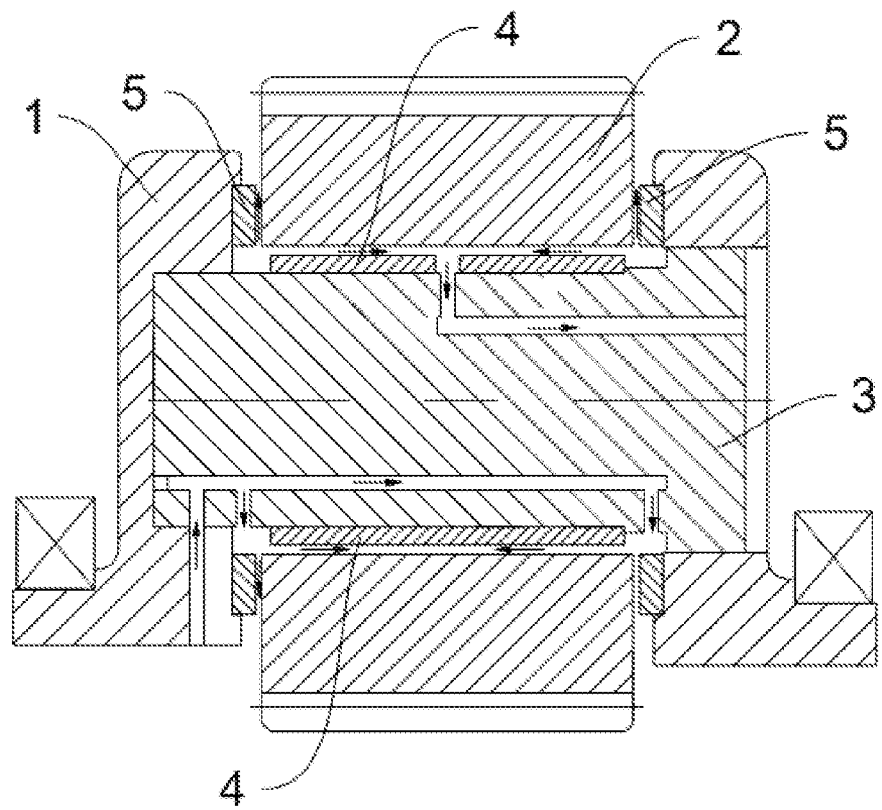
FIG. 2 is a flow diagram of the lubricating oil in FIG. 1.
Figure 3:
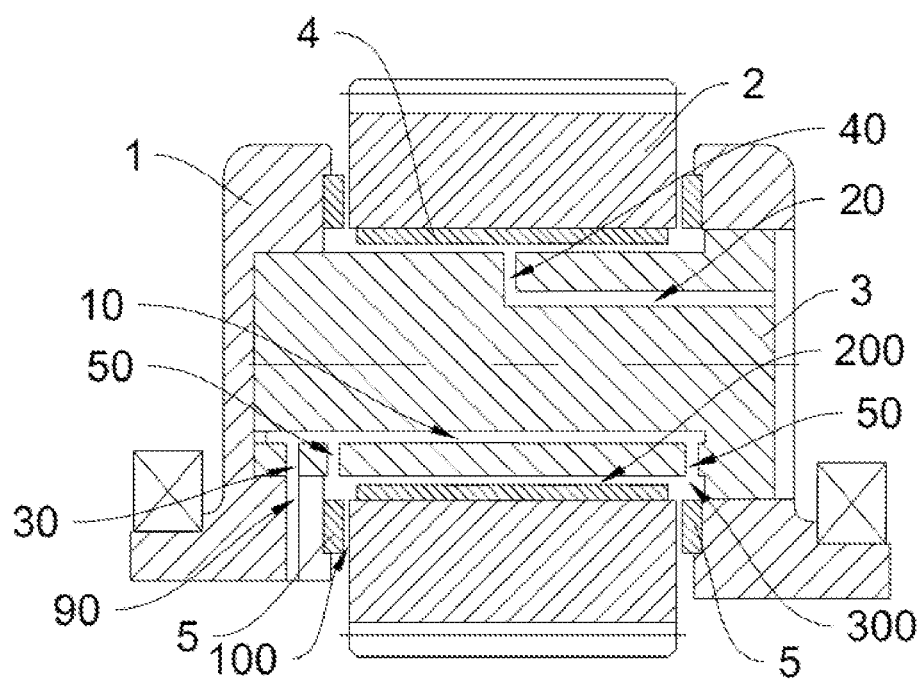
FIG. 3 is diagram two illustrating the structure of the transmission mechanism provided with a sliding bearing according to an embodiment of the present application (with a gap fit between the sliding bearing and a pin).
Figure 4:
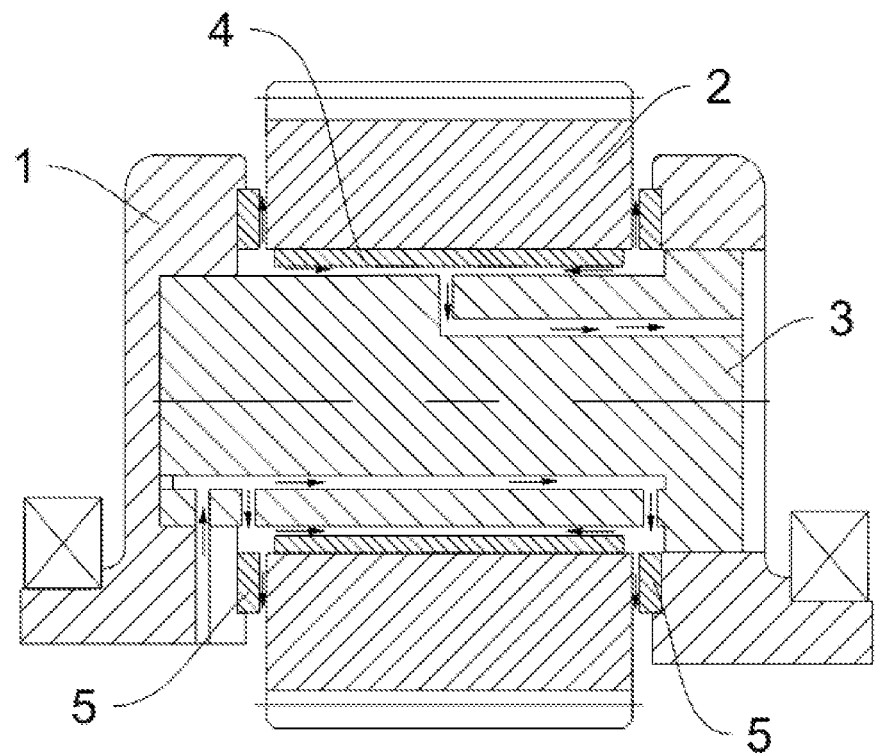
FIG. 4 is a flow diagram of the lubricating oil in FIG. 3.

As shown in FIGS. 1 and 2, when the second lubrication gap 200 is formed between the outer circumference of the sliding bearing 4 and the planet gear 2, that is, when an inner ring of the sliding bearing 4 and the pin 3 have no rotational fit, a radial oil discharge hole 60 is disposed on the sliding bearing 4 in the radial direction. Two ends of the radial oil discharge hole 60 communicate with the second lubrication gap 200 and the radial oil discharge channel 40 respectively. After flowing through the second lubrication gap 200 to lubricate the sliding bearing 4, the lubricating oil flows into the radial oil discharge channel 40 and the axial oil discharge channel 20 through the radial oil discharge hole 60 and then is discharged into the gearbox oil pool. As shown in FIGS. 3 and 4, when the second lubrication gap 200 is formed between the inner circumference of the sliding bearing 4 and the pin 3, that is, when an outer ring of the sliding bearing 4 and the planet gear 2 have no rotational fit, it is unnecessary to dispose a hole on the sliding bearing 4. After flowing through the second lubrication gap 200 to lubricate the sliding bearing 4, the lubricating oil flows into radial oil discharge channel 40 and the axial oil discharge channel 20 directly and then is discharged into the gearbox oil pool.

In an embodiment, the radial oil discharge channel 40 is opposite to a middle part of the sliding bearing 4 so that the lubricating oil has the same flowing route after entering the second lubrication gap 200 from two end surfaces of the sliding bearing 4 and before entering the radial oil discharge channel 40, helping improve the lubrication effect. In other embodiments, the arrangement position of the radial oil discharge channel 40 may also be opposite to any position of the sliding bearing 4 and is specifically designed according to actual needs.

In an embodiment, one or more sliding bearings 4 may be arranged. A plurality of sliding bearings 4 are spaced apart in the axial direction of the pin 3. Exemplarily, as shown in FIGS. 5 to 8, two sliding bearings 4 are provided. The two sliding bearings 4 are spaced apart in the axial direction of the pin 3. Moreover, a distance ring 6 is disposed between the two sliding bearings 4. The distance ring 6 performs a limiting effect for the two sliding bearings 4 to prevent the two sliding bearings 4 from interacting with each other. In an embodiment, the oil channels further include a second oil distribution channel 70. The second oil distribution channel 70 is disposed on the pin 3 in the radial direction. The second oil distribution channel 70 communicates with the oil inlet channel 10 and the second lubrication gap 200. In an embodiment, the second oil distribution channel 70 is opposite to the distance ring 6. The lubricating oil flowing out of the second oil distribution channel 70 separately flows into the second lubrication gap 200 corresponding to the two sliding bearings 4 to lubricate the two sliding bearings 4, helping improve the lubrication effect.

In this embodiment, two radial oil discharge channels 40 are provided. Each radial oil discharge channel 40 corresponds to a sliding bearing 4. That is, the distance ring 6 is located between the two radial oil discharge channels 40. The lubricating oil entering the second lubrication gap 200 from the first oil distribution channels 50 and the lubricating oil entering the second lubrication gap 200 from an oil passing cavity 400 converge into the radial oil discharge channels 40, helping improve the distribution evenness of the lubricating oil and improve the lubrication effect.

Figure 5:
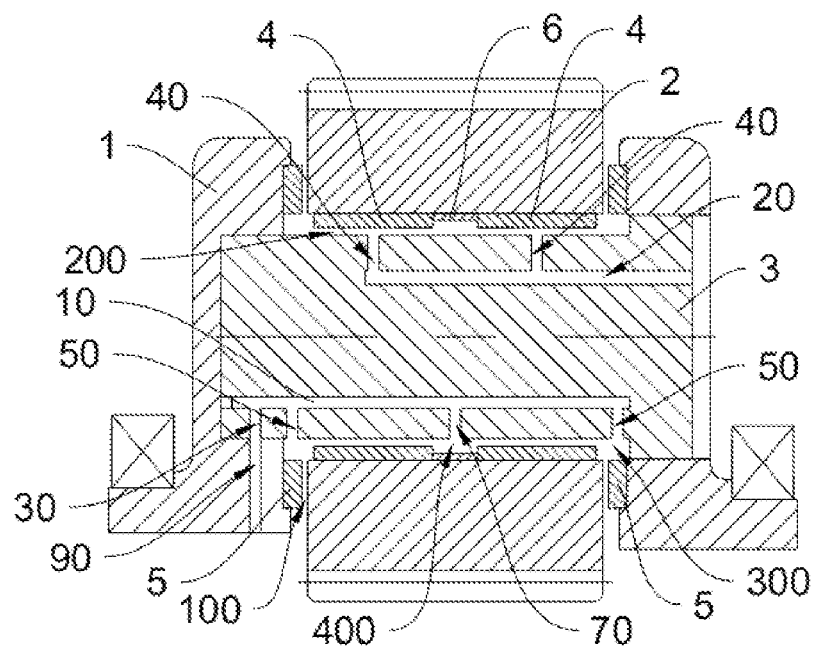
FIG. 5 is diagram one illustrating the structure of a transmission mechanism provided with two sliding bearings according to an embodiment of the present application (with a gap fit between a sliding bearing and a pin).
Figure 6:
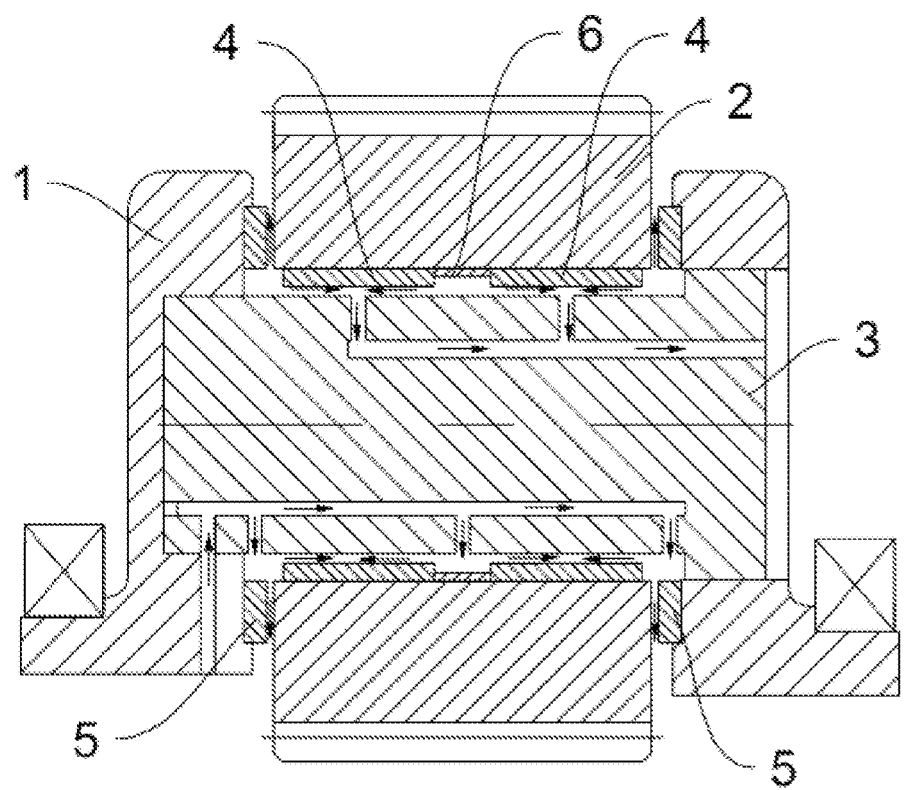
FIG. 6 is a flow diagram of the lubricating oil in FIG. 5.

As shown in FIGS. 5 and 6, when the second lubrication gap 200 is formed between the inner circumference of the sliding bearing 4 and the pin 3, the oil passing cavity 400 is formed between the two sliding bearings 4, the distance ring 6, and the pin 3. The oil passing cavity 400 communicates with the second lubrication gap 200. The lubricating oil in the oil inlet channel 10 flows into the oil passing cavity 400 through the second oil distribution channel 70, then flows toward the second lubrication gap 200 corresponding to the two sliding bearings 4, flows into the axial oil discharge channel 20 through the radial oil discharge channels 40 after lubricating the sliding bearings 4, and is finally discharged.

Figure 7:
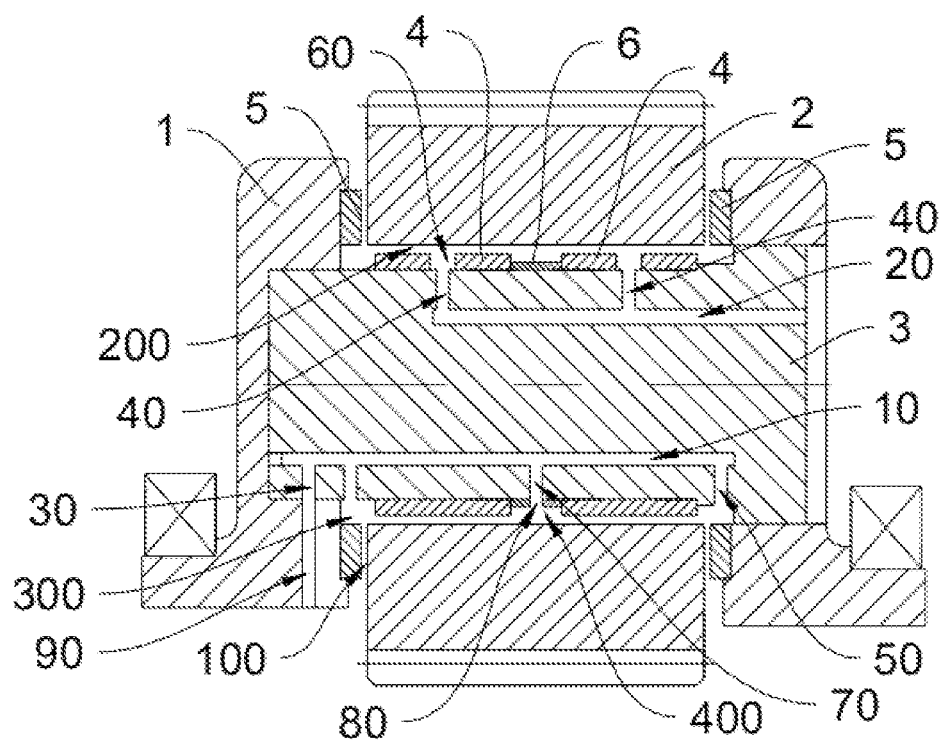
FIG. 7 is diagram two illustrating the structure of the transmission mechanism provided with two sliding bearings according to an embodiment of the present application (with no rotational fit between a sliding bearing and a pin).
Figure 8:
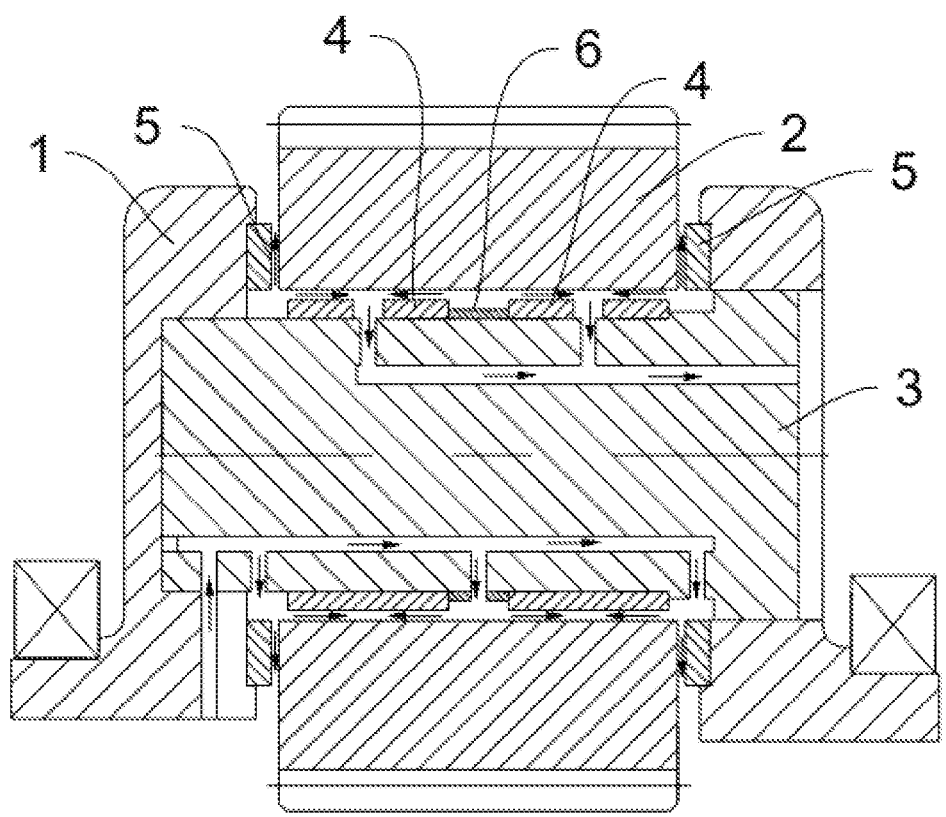
FIG. 8 is a flow diagram of the lubricating oil in FIG. 7.

As shown in FIGS. 7 and 8, when the second lubrication gap 200 is formed between the outer circumference of the sliding bearing 4 and the planet gear 2, the oil passing cavity 400 is formed between the two sliding bearings 4, the distance ring 6, and the planet gear 2. The oil passing cavity 400 communicates with the second lubrication gap 200. In an embodiment, an oil passing hole 80 is disposed on the distance ring 6. Two ends of the oil passing hole 80 communicate with the second oil distribution channel 70 and the oil passing cavity 400 respectively. The lubricating oil in the oil inlet channel 10 flows into the oil passing cavity 400 through the second oil distribution channel 70 and the oil passing hole 80, then flows toward the second lubrication gap 200 corresponding to the two sliding bearings 4, flows into the axial oil discharge channel 20 through the radial oil discharge channels 40 after lubricating the sliding bearings 4, and is finally discharged. In this embodiment, a preceding radial oil discharge hole 60 is disposed on each of the two sliding bearings 4. Two ends of a radial oil discharge hole 60 communicate with the second lubrication gap 200 and a radial oil discharge channel 40 respectively so that the lubricating oil has the same lubrication effect on the two sliding bearings 4, with the lubrication effect relatively sound.

In other embodiments, when more than two sliding bearings 4 are provided, a plurality of radial oil discharge channels 40 are also provided. The radial oil discharge channels 40 correspond to the sliding bearings 4 in a one-to-one manner. A plurality of oil passing cavities 400 and a plurality of second oil distribution channels 70 are also provided. An oil passing cavity 400 is formed between two adjacent sliding bearings 4, the distance ring 6, and the pin 3 or between two adjacent sliding bearings 4, the distance ring 6, and the planet gear 2. The oil passing cavity 400 communicates with the second lubrication gap 200 and one second oil distribution channel 70. The lubricating oil partially enters into the second lubrication gap 200 through two oil distribution cavities 300 and partially enters into the second lubrication gap 200 through the second oil distribution channels 70 to lubricate the sliding bearings 4. After lubricating the sliding bearings 4, the lubricating oil is discharged through radial oil discharge channels 40.

The transmission mechanism provided in this embodiment may be applied to, but is not limited to being applied to, a gearbox. By adopting the preceding transmission mechanism, the lubricating oil has a relatively sound lubrication effect on each sliding bearing 4 and each thrust bearing 5, effectively guaranteeing the service reliability of the gearbox and prolonging the service life of the gearbox.

What is claimed is:

1. A transmission mechanism, comprising a planet carrier, a planet gear, a pin, a sliding bearing, and a plurality of thrust bearings, wherein
   the planet gear is rotatably disposed on the planet carrier through the pin, the thrust bearings are disposed between one end of the planet gear and the planet carrier, and between another end of the planet gear and the planet carrier, respectively, and a first lubrication gap is formed between each thrust bearing of the thrust bearings and an end surface of the planet gear;
   the sliding bearing is sleeved on the pin and is disposed between the planet gear and the pin;
   a second lubrication gap is formed between an inner circumference of the sliding bearing and the pin or between an outer circumference of the sliding bearing and the planet gear;
   oil channels are disposed on the pin, lubricating oil enters into the first lubrication gap and the second lubrication gap through the oil channels respectively;
   an oil discharge channel is disposed on the pin;
   a part of the lubricating oil entering into the first lubrication gap is configured to flow along the first lubrication gap to lubricate the thrust bearings and is configured to be discharged directly after lubricating the thrust bearings;
   other part of the lubricating oil entering into the second lubrication gap is configured to flow along the second lubrication gap to lubricate the sliding bearing and finally flow to the oil discharge channel to be discharged after lubricating the sliding bearing; and
   a first end of the oil discharge channel communicates with the second lubrication gap, and a second end of the oil discharge channel is configured to make the other part of the lubricating oil to be finally discharged from the inside of the pin without flowing through the first lubrication gap.

2. The transmission mechanism according to claim 1, wherein an oil inlet channel is disposed on the pin;
   the oil channels comprise at least two first oil distribution channels; and
   the oil inlet channel is configured to feed the lubricating oil, a first end of each first oil distribution channel of the at least two first oil distribution channels communicates with the oil inlet channel, and a second end of the each first oil distribution channel communicates with the second lubrication gap and the first lubrication gap.

3. The transmission mechanism according to claim 2, wherein two ends of the sliding bearing, the planet carrier, the planet gear, the pin, and the thrust bearings form oil distribution cavities; the oil distribution cavities communicate with the first lubrication gap and the second lubrication gap; and two ends of each first oil distribution channel communicate with the oil inlet channel and one oil distribution cavity.

4. The transmission mechanism according to claim 2, wherein the oil discharge channel comprises a radial oil discharge channel and an axial oil discharge channel, the axial oil discharge channel extends in an axial direction of the pin, the radial oil discharge channel extends in a radial direction of the pin, and two ends of the radial oil discharge channel communicate with the second lubrication gap and the axial oil discharge channel respectively.

5. The transmission mechanism according to claim 4, wherein when the second lubrication gap is formed between the outer circumference of the sliding bearing and the planet gear, a radial oil discharge hole is disposed on the sliding bearing in the radial direction, and two ends of the radial oil discharge hole communicate with the second lubrication gap and the radial oil discharge channel respectively.

6. The transmission mechanism according to claim 4, further comprising a distance ring, wherein at least two sliding bearings are spaced apart in the axial direction of the pin, and the distance ring is disposed between the two adjacent sliding bearings.

7. The transmission mechanism according to claim 6, wherein at least two radial oil discharge channels are disposed on the pin in the radial direction, and the at least two radial oil discharge channels correspond to the at least two sliding bearings in a one-to-one manner.

8. The transmission mechanism according to claim 6, wherein the oil channels further include at least one second oil distribution channel, the at least one second oil distribution channel is disposed on the pin in the radial direction, a second oil distribution channel of the at least one second oil distribution channel is located between two first oil distribution channels of the at least two first oil distribution channels, and two ends of the second oil distribution channel communicate with the second lubrication gap and the oil inlet channel respectively.

9. The transmission mechanism according to claim 8, wherein an oil passing cavity is formed between two adjacent sliding bearings, the distance ring, and the pin, or between two adjacent sliding bearings, the distance ring, and the planet gear; and the oil passing cavity communicates with the second lubrication gap and one second oil distribution channel of the at least one second oil distribution channel.

10. The transmission mechanism according to claim 9, wherein when the second lubrication gap is formed between the outer circumference of the sliding bearing and the planet gear, an oil passing hole is disposed on the distance ring, and two ends of the oil passing hole communicate with the second oil distribution channel and the oil passing cavity respectively.

* * * * *